Oct. 18, 1949.   A. C. COUTANT   2,484,982
MOTION-PICTURE CAMERA STAND
Filed Feb. 6, 1946   2 Sheets-Sheet 1

Inventor:
André Clément Coutant
By: Thomas W. West, Atty.

Oct. 18, 1949.　　　　A. C. COUTANT　　　　2,484,982
MOTION-PICTURE CAMERA STAND
Filed Feb. 6, 1946　　　　　　　　　　2 Sheets-Sheet 2

Inventor:
André Clément Coutant

Patented Oct. 18, 1949

2,484,982

UNITED STATES PATENT OFFICE 2,484,982

MOTION-PICTURE CAMERA STAND

André Clément Coutant, Paris, France, assignor to Suzanne Rosalie Coutard, born Mathot, Paris, France Application February 6, 1946, Serial No. 645,870
In France August 13, 1943

Section 1, Public Law 690, August 8, 1946
Patent expires August 13, 1963

1 Claim. (Cl. 248—161)

The subject of the present invention is a trolley mounted elevating stand for a motion picture camera.

These apparatus, which are known, are mainly intended for taking pictures in the studio. They comprise a trolley, generally having three arms, rolling on three wheels with solid rubber tyres, which are orientable by means of a steering lever which is itself orientable, and, on said trolley, an elevating device, for example a telescopic column, or a lazy tongs device, supporting the camera.

The hitherto known or proposed apparatus have various drawbacks.

One of the most serious is that of requiring two assistants in addition to the camera operator to operate them, while not enabling the operator himself to complete the adjustment of the height and the orientation of the stand while he checks, in the viewfinder of the camera, the framing of the scene to be taken.

When the elevating device is a telescopic column having two tubes, the control of the inner tube necessitates complicated and noisy gearing.

Certain of these apparatus have an irreversible elevating drive, their operation is slow. Others have a reversible drive and have to be provided with a brake; as the weight of the camera is considerable, 80 kgs. for example, in the event of the operator's forgetting to apply the brake, or of the defective operation of the same, the camera moves downwards of its own accord at great speed and the impact at the end of travel causes damage.

The extent of vertical travel is relatively small.

The rolling of the trolley, which generally has chains or gears to connect the three wheels to each other, is not silent.

The subject of the present invention is a trolley mounted stand which overcomes these drawbacks.

It is specially designed to enable the camera operator to manipulate it, if necessary without assistants. It furthermore provides various advantages which are explained hereinafter.

Said trolley mounted elevating stand having orientable wheels which are controlled by a steering lever, is characterized mainly by the fact that it comprises a plurality of control members for the elevating mechanism, which are so arranged that at whatever height the camera is set, at least one of said control members is located near said camera, in a position where it can be manipulated by the operator looking into the viewfinder.

By way of example, one embodiment of this trolley mounted stand is described hereinafter and illustrated in the accompanying drawing.

Figure 1:
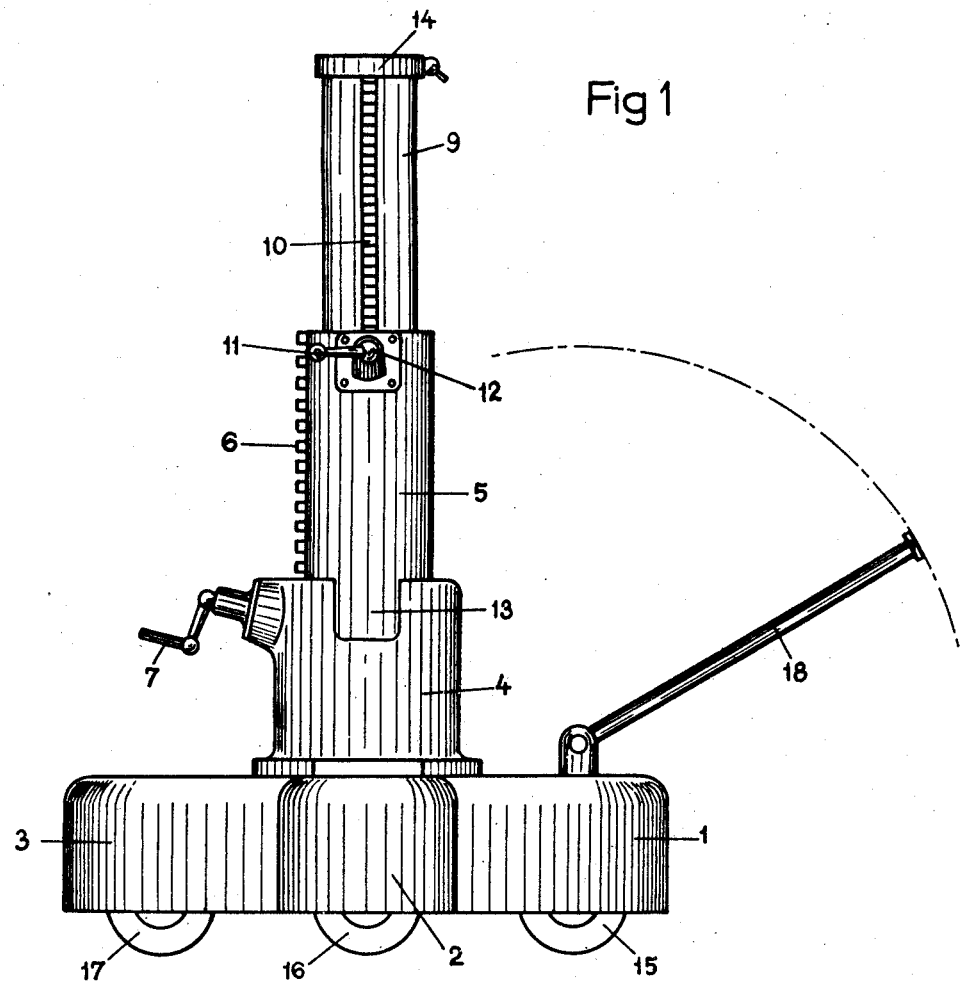
Figs. 1 and 2 are outside views, respectively in the raised position and in the lowered position, with the steering lever in two different positions.
Figure 3:
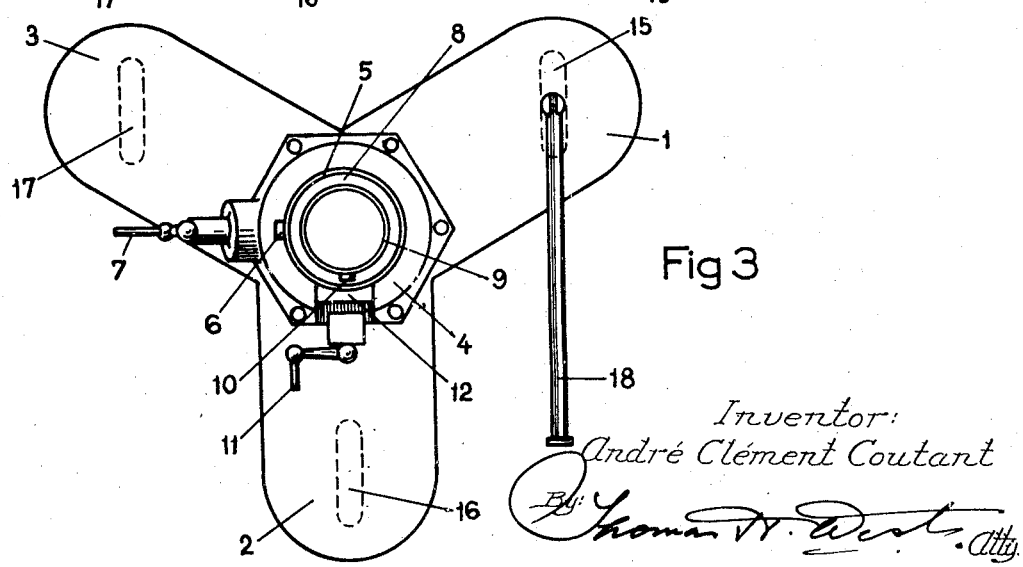
Fig. 3 is a plan view corresponding to Fig. 2.

The trolley comprises a frame which has three arms 1, 2, 3, and is secured to a cylindrical sleeve 4. In said sleeve 4 there slides, with a running fit, a first telescopic tube 5 provided with a rack 6, for the passage of which a vertical slot is provided in the sleeve 4. The operation of the tube 5 is effected by means of a crank 7 mounted at the upper part of the sleeve 4. Inside an inner bush 8 (Fig. 3), mounted at the upper part of said first telescopic tube 5 and provided with a vertical slot, slides the second telescopic tube 9 which is fitted with a rack 10 and which is provided at its base with a guide bush identical with the bush 8 (below which it is projected in Fig. 3). The operation of this tube is controlled by a crank 11, the axis of which is in a diametral plane of the stand perpendicular to that of the crank 7; this crank 11 is carried by a bearing 12 which is fixed at the upper part of the outer telescopic tube 5 and for the accommodation of which, in the lowered position of said tube, a notch 13 is provided in the sleeve 4. At its upper part, the inner telescopic tube 9 carries the platform 14 on which the camera is fixed. Each of the arms 1, 2, 3 of the trolley carries a pivoted wheel 15, 16, 17 respectively, provided with a solid rubber tyre. One of said wheels 15, the one most nearly opposite the lower crank 7, is secured to a steering lever 18, the length of which is such that, in the position of maximum elevation of the stand, its end is still within reach of the cameraman's hand as he looks into the viewfinder.

Figure 4:
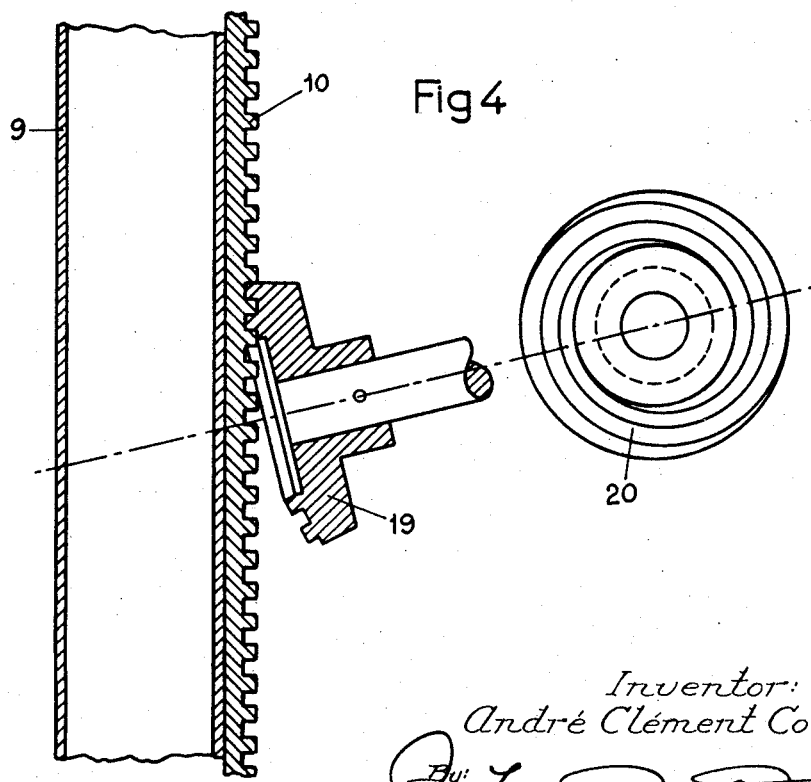
Fig. 4 shows a diametral section of a particular device for telescopic control by means of a conical screw and rack, the end view of said conical screw being shown on the right of this figure.

Each of the cranks, the lower one 7 and the upper one 11, drive a conical screw 19 (Fig. 4) formed by a single spiral thread 20 (see on the right of Fig. 4 the end view of said screw) cut on a very wide angle cone, the upper generatrix of which is vertical and which meshes, along said generatrix, with the rack to be driven, for example the rack 10 of the inner telescopic tube 9.

Figure 2:
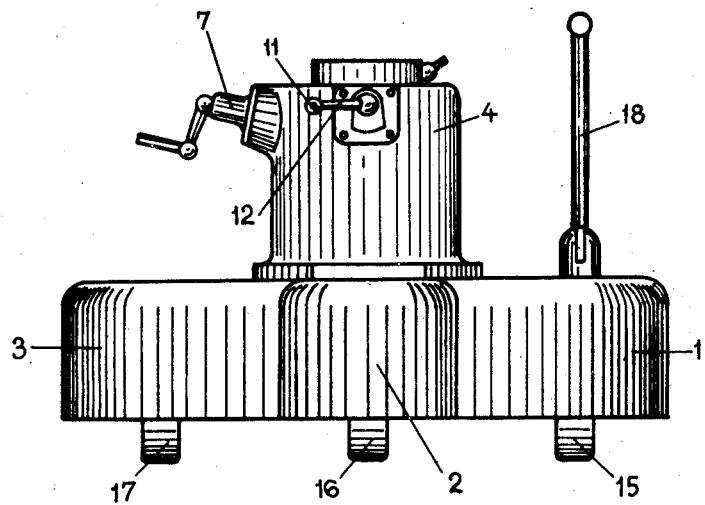

The use and the advantages of this stand are as follows:

According to whether the picture is to be taken at a more or less high level, the operator, starting from the lowered position (Fig. 2), first manipulates the lower crank 7 until the outer tube 5, inside which the tube 9 is retracted, has completely emerged; the total elevating travel being for example 65 centimetres, throughout the whole of this operation the crank 7 remains within reach of the left hand of the operator who has his eye against the viewfinder; then the operator manipulates the upper crank 11, retaining the same advantage until the maximum elevation has been reached. During all this time, the lever 18 is also within reach of his right hand.

The drive of the racks by means of a spiral threaded conical screw permits, owing to the relatively large diameter of the spiral, the thread to be inclined relatively steeply with respect to the horizontal while retaining the irreversibility of this drive; a given elevation can thus be obtained with a smaller number of turns of the crank.

The existence of two cranks which can be operated simultaneously enables the time required for the complete upward travel to be halved with respect to the old apparatus with a single crank.

The possibility of moving the lever 18 downwards on one side or the other about its pivot in the clevis 24 will enable, in numerous cases, the bulk of the stand to be decreased, so that said stand can, for example, be pushed further against an obstacle such as a partition, or into a corner of the scenery where it could not have been placed if the lever 18 had not been able to swing downwards in this manner.

In the case in which it would be useful to provide for a greater height of elevation of the camera than the usual height for which the device illustrated is sufficient (about 65 cm.), an elevating platform (not shown) may be added to this apparatus, or an expanding ladder, or any other similar device, on which the operator will stand and which will move upwards at the same time as the camera is elevated by its telescopic column which, in that case, will comprise a larger number of tubes and an equal number of operating cranks. This elevating device for the operator, which will move parallel with that of the camera, will preferably be organised in the same manner and in this case, the same control or controls can be used for the simultaneous operation of the two elevating devices. The operator will thus retain the same advantage of having an elevating member within reach of his hand while he has his eye against the viewfinder.

I claim:

A trolley mounted elevating stand for a motion picture camera comprising, a fixed sleeve, a tube mounted for sliding movement in said sleeve, a rack gear carried by the periphery of said tube, a wheel meshing with said rack gear, a crank for operating said wheel mounted for rotation adjacent the top of said sleeve, a second tube mounted for sliding movement in the first tube, a rack gear carried by the periphery of the second tube, a toothed wheel meshing with the teeth of the second rack gear, a crank for operating the toothed wheel mounted for rotation adjacent the top of the first tube, means carried by the top of the second tube for supporting a motion picture camera thereon, said sleeve having a notch in the upper end thereof circumferentially displaced from the first crank for receiving the second crank in a collapsed condition of the stand, said sleeve being of such length that the crank on the fixed sleeve is arranged sufficiently near the floor so as to be manipulated by the operator of the camera when the stand is in a collapsed condition, the length of each of said tubes being not greater than the distance of the first crank from the floor so as to facilitate free displacement of the trolley when collapsed, and said tubes being short enough so that the second may be manipulated by an operator looking in a view finder of the camera.

ANDRÉ CLÉMENT COUTANT.

REFERENCES CITED

The following references are of record in the file of this patent:

UNITED STATES PATENTS

| Number | Name | Date |
|---|---|---|
| 183,502 | Kindermann | Oct. 24, 1876 |
| 488,258 | Williams et al. | Dec. 20, 1892 |
| 929,169 | Setzer | July 27, 1909 |
| 1,588,295 | Berman | June 8, 1926 |
| 1,999,844 | McElroy | Apr. 30, 1935 |
| 2,224,901 | Cunningham | Dec. 17, 1940 |

FOREIGN PATENTS

| Number | Country | Date |
|---|---|---|
| 608,777 | France | Aug. 2, 1926 |